US012237886B2

United States Patent
Patury et al.

(10) Patent No.: US 12,237,886 B2
(45) Date of Patent: Feb. 25, 2025

(54) MULTI-ANTENNA WIRELESS TRANSMITTER AND METHOD WITH MIMO BEAMFORMING

(71) Applicant: Huawei Technologies Co., Ltd., Shenzhen (CN)

(72) Inventors: Shahar Patury, Hod Hasharon (IL); Avi Weitzman, Hod Hasharon (IL); Doron Ezri, Hod Hasharon (IL); Avner Epstein, Hod Hasharon (IL); Arik Klein, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 18/322,864

(22) Filed: May 24, 2023

(65) Prior Publication Data
US 2023/0299816 A1 Sep. 21, 2023

Related U.S. Application Data

(63) Continuation of application No. PCT/EP2021/051248, filed on Jan. 21, 2021.

(51) Int. Cl.
*H04B 7/0452* (2017.01)
*H04B 7/06* (2006.01)
*H04W 84/12* (2009.01)

(52) U.S. Cl.
CPC ......... *H04B 7/0452* (2013.01); *H04B 7/0617* (2013.01); *H04W 84/12* (2013.01)

(58) Field of Classification Search
CPC .. H04B 7/0452; H04B 7/0617; H04B 7/0413; H04B 7/0695; H04B 7/0408; H04B 7/0634; H04B 7/088; H04B 17/309; H04B 7/0478; H04B 7/0632; H04B 7/0626
See application file for complete search history.

(56) References Cited

U.S. PATENT DOCUMENTS

| | | | |
|---|---|---|---|
| 10,298,370 B1* | 5/2019 | Chu | H04L 5/0048 |
| 10,805,940 B2* | 10/2020 | Zhou | H04B 7/026 |
| 2019/0097695 A1* | 3/2019 | Patwardhan | H04B 7/0456 |
| 2019/0281484 A1* | 9/2019 | Jiang | H04L 1/0026 |
| 2021/0152396 A1* | 5/2021 | Cherian | H04W 48/16 |
| 2022/0078792 A1* | 3/2022 | Jeon | H04W 72/0453 |
| 2022/0224381 A1* | 7/2022 | Yun | H04B 7/063 |

* cited by examiner

*Primary Examiner* — Khanh C Tran
(74) *Attorney, Agent, or Firm* — Conley Rose, P.C.

(57) ABSTRACT

A wireless initiator access point comprising a communication interface with an array of antennas and configured to operate the array of antennas with a precoding configuration for multi-user multiple-input multiple-output (MU-MIMO) communication with a plurality of wireless stations; send a Null Data Packet (NDP) Announcement frame to the wireless stations; trigger a wireless participator access point to send an NDP frame to the wireless stations; receive a plurality of Compressed Beamforming frames from the wireless stations; and forward the Compressed Beamforming frames to the wireless participator access point.

20 Claims, 6 Drawing Sheets

MULTI-ANTENNA WIRELESS TRANSMITTER AND METHOD WITH MIMO BEAMFORMING

CROSS-REFERENCE TO RELATED APPLICATIONS

This application is a continuation application of International Patent Application No. PCT/EP2021/051248, filed on Jan. 21, 2021, the disclosure of which is hereby incorporated by reference in its entirety.

TECHNICAL FIELD

The present disclosure relates to wireless communications. More specifically, the present disclosure relates to a multi-antenna wireless transmitter, such as a multi-antenna base station, and method with multiple-input and multiple-output (MIMO) beamforming.

BACKGROUND

The Institute of Electrical and Electronics Engineers (IEEE) 802.11-based wireless local-area networks (WLANs) have become popular at an unprecedented rate. WLAN supports a variety of data transfer modes including (but not only) file transfer, emails, web browsing and real-time applications such as audio and video applications. For efficiently supporting high throughputs, the evolving IEEE 802.11 standards specify several transmission (TX) schemes that can be used by a wireless transmitter. Particularly useful for increasing the link throughput are TX schemes which deploy multiple TX antennas (some, but not all, also requiring multiple RX antennas on the receiver side, i.e. the wireless receiver), which are so called MIMO modes. Multiple TX antennas, often with each antenna being accompanied by a dedicated TX processing chain including a Power Amplifier (PA), can be utilized in different advantageous ways, such as spatial TX diversity for improving the link reliability and performance, beamforming (BF), i.e. focusing the radiated power in the direction(s) of target receiver(s) (and/or suppressing it in undesirable directions, for reducing unwanted interference to non-targeted receivers), and/or spatial multiplexing (SM), i.e. sending multiple data streams simultaneously over the same time-frequency resources, either to the same receiver or to different ones.

SUMMARY

It is an objective of the present disclosure to provide an improved multi-antenna wireless transmitter and method with MIMO beamforming.

The foregoing and other objectives are achieved by the subject matter of the independent claims. Further implementation forms are apparent from the dependent claims, the description and the figures.

According to a first aspect a first type of wireless access point (AP) is provided, which will be referred to interchangeably in the following disclosure as a wireless initiator AP or short wireless IAP. The wireless initiator AP according to the first aspect comprises a communication interface with an array of antennas. The communication interface of the wireless initiator AP is configured to operate the array of antennas with an adjustable precoding configuration for multi-user-multiple-input multiple-output (MU-MIMO) communication with a plurality of multi-antenna wireless stations, i.e. wireless clients or terminals.

The communication interface of the wireless IAP is further configured to send a null data packet (NDP) Announcement frame to the plurality of wireless stations, i.e. clients and to trigger a further multi-antenna wireless AP (herein referred to as wireless participator AP or wireless PAP) to send an NDP frame to the plurality of wireless stations.

The communication interface is further configured to receive a plurality of Compressed Beamforming frames (i.e. precoder information) from the plurality of wireless stations, (i.e. clients) and to forward the plurality of Compressed Beamforming frames (i.e. the precoder information) to the wireless participator access point.

In an example, advantageously, using the existing 802.11 BF and MU-MIMO schemes of BF the IAP and the PAP may obtain precoder information from all relevant wireless stations. Thereby, the PAP may increase its spatial reuse coverage, while reducing the interference between transmissions and maintaining a high signal-to-interference-plus-noise-ratio (SINR) level with its wireless stations by using the precoder information from the stations of the IAP. By increasing the signal ratio (SR) coverage and SINR the SR efficiency is improved.

In a further possible implementation form of the first aspect, the communication interface of the wireless IAP is configured to send the NDP Announcement frame to the plurality of wireless stations and the wireless participator AP for triggering the wireless participator AP to send the NDP frame to the plurality of wireless stations.

In a further possible implementation form of the first aspect, the communication interface of the wireless IAP is further configured to request AP Beacon information from the plurality of wireless stations and to send based on the AP Beacon information the NDP Announcement frame to those of the plurality of wireless stations that are able to communicate with the wireless participator access point.

In a further possible implementation form of the first aspect, the communication interface of the wireless IAP is configured to forward the plurality of Compressed Beamforming frames via an IP backbone network to the wireless participator access point. In an implementation form, the triggering of the wireless participator AP to send the NDP frame to the plurality of wireless stations may occur via the IP backbone network, for instance, by means of a triggering signal or message transmitted via the IP backbone network.

In a further possible implementation form of the first aspect, the NDP- Announcement frame comprises information on whether the wireless initiator access point or the wireless participator access point sends the NDP frame to the plurality of wireless stations, i.e. clients. The information may comprise an identifier of the wireless initiator access point or an identifier of the wireless participator access point.

In a further possible implementation form of the first aspect, the wireless initiator access point is configured to operate in accordance with the IEEE 802.11 WLAN standard or a standard evolved therefrom, in particular 802.11ax or 802.11ac.

According to a second aspect a wireless participator access point (PAP) is provided. The wireless PAP (like the wireless IAP) comprises a communication interface with an array of antennas, wherein the communication interface is configured to operate the array of antennas with an adjustable precoding configuration for MU-MIMO communication with a plurality of multi-antenna wireless stations, i.e. clients.

The communication interface is further configured to be triggered to send an NDP frame to one or more of the plurality of wireless stations and/or to one or more of a further plurality of wireless stations for triggering the one or more of the plurality of wireless stations and/or the one or more of the further plurality of wireless stations to send a plurality of Compressed Beamforming frames to the wireless initiator access point. Moreover, the communication interface is configured to receive the plurality of Compressed Beamforming frames from the wireless initiator access point.

The wireless participator access point further comprises a processing circuitry configured to determine the precoding configuration for operating the antenna array based on the plurality of Compressed Beamforming frames.

In an example, advantageously, using the existing 802.11 BF and MU-MIMO schemes of BF the IAP and the PAP may obtain precoder information from all relevant wireless stations. Thereby, the PAP may increase its spatial reuse coverage, while reducing the interference between transmissions and maintaining a high SINR level with its wireless stations by using the precoder information from the stations of the IAP. By increasing the SR coverage and SINR the SR efficiency is improved.

In a further possible implementation form of the second aspect, the communication interface is configured to receive an NDP Announcement frame from the wireless initiator access point and to send, in response to the NDP Announcement frame, the NDP frame to the one or more of the plurality of wireless stations and/or to the one or more of the further plurality of wireless stations for triggering the one or more of the plurality of wireless stations and/or the one or more of the further plurality of wireless stations to send the plurality of Compressed Beamforming frames to the wireless initiator access point.

In a further possible implementation form of the second aspect, the precoding configuration comprises a steering matrix, wherein the communication interface is configured to null one or more of the plurality of wireless stations, i.e. clients based on the steering matrix.

In a further possible implementation form of the second aspect, the wireless PAP is an overlapping basic service set (OBSS) of the wireless IAP.

In a further possible implementation form of the second aspect, the wireless initiator access point is configured to operate in accordance with the IEEE 802.11 WLAN standard or a standard evolved therefrom, in particular 802.11ax or 802.11ac.

According to a third aspect a method for MU-MIMO communication with a plurality of multi-antenna wireless stations, i.e. clients is provided. The method according to the third aspect comprises the steps of: operating an array of antennas with an adjustable precoding configuration for MU-MIMO communication with the plurality of wireless stations; sending an NDP-Announcement frame to the plurality of wireless stations, i.e. clients; triggering a multi-antenna wireless PAP to send an NDP frame to the plurality of wireless stations, i.e. clients; receiving a plurality of Compressed Beamforming frames from the plurality of wireless stations, i.e. clients; and forwarding the plurality of Compressed Beamforming frames to the wireless participator access point.

In a further possible implementation form of the third aspect, the step of sending the NDP-Announcement frame comprises sending the NDP-Announcement frame to the plurality of wireless stations and the multi-antenna wireless participator access point for triggering the multi-antenna wireless participator access point to send the NDP frame to the plurality of wireless stations.

In a further possible implementation form of the third aspect, the method further comprises the step of determining the precoding configuration for operating the antenna array based on the plurality of Compressed Beamforming frames.

In a further possible implementation form of the third aspect, the precoding configuration comprises a steering matrix, wherein the method further comprises the step of nulling one or more of the plurality of wireless stations, i.e. clients based on the steering matrix.

According to a fourth aspect a computer program product is provided, comprising program code which causes a computer or a processor to perform the method according to the third aspect, when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, aspects of embodiments of the present disclosure or aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of method steps is described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps is not explicitly described or illustrated in the figures. Further, it is understood that the features of the various exemplary embodiments and/or aspects described herein may be combined with each other, unless noted otherwise.

Figure 1:
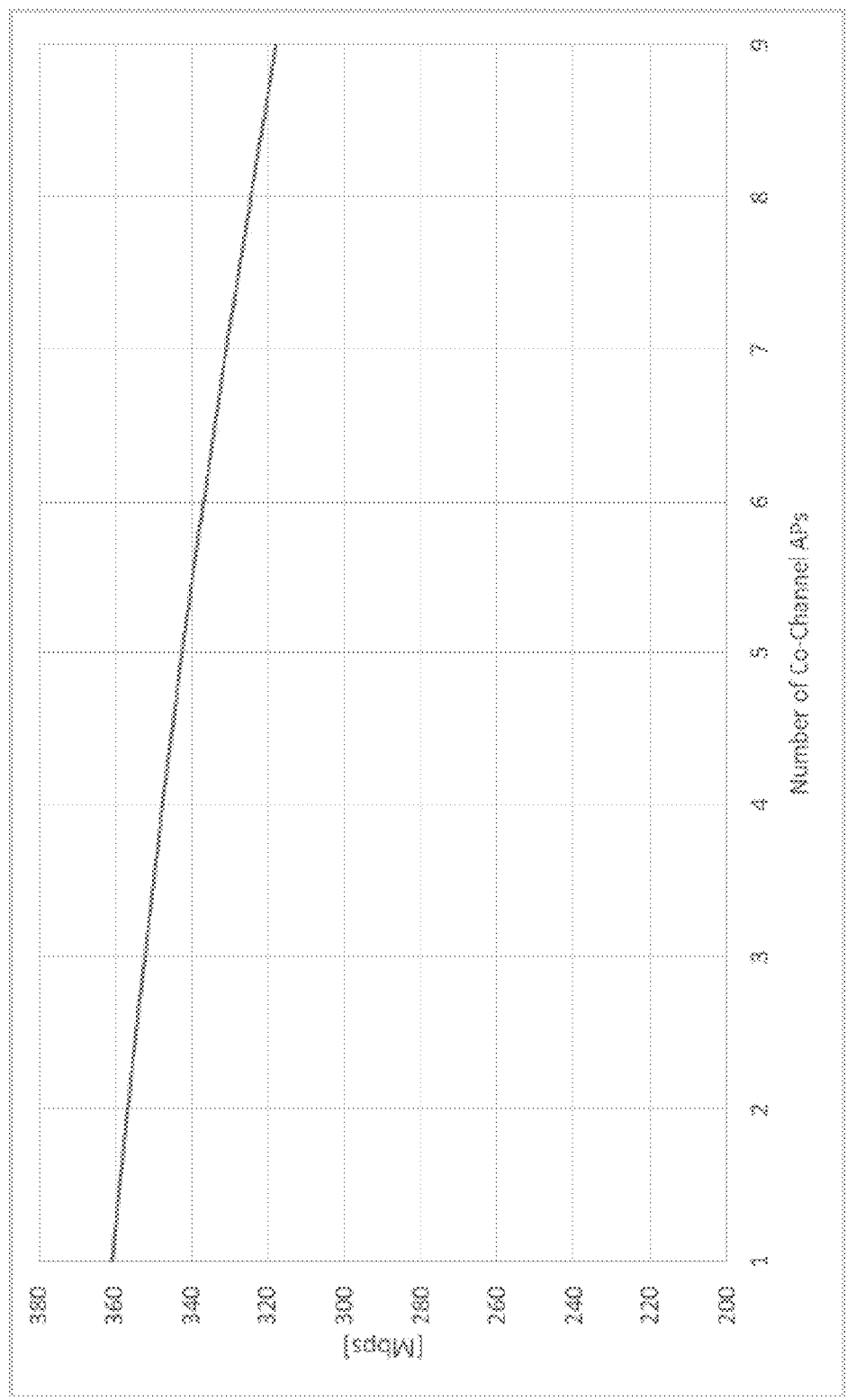
FIG. 1 shows an exemplary dependency of the data rate of a WLAN network on the number of access points using the same communication channels.

Before describing different embodiments in more detail, in the following some technical background as well as terminology concerning wireless transmitters, in particular wireless transmitters in accordance with the IEEE 802.11 WLAN standard will be introduced making use of the following abbreviations:

AID Association Identifier
AP Access Point
BF Beam-forming
BSS Basic Service Set
BW Bandwidth
CA Certification Authority/Collision Avoidance/Carrier Aggregation
CCA Clear Channel Assessment
CSMA Carrier Sense Multiple Access
HD High Density
HEW High Efficient Wi-Fi
IP Internet Protocol
MAC Medium Access Control
MCS Modulation and Coding Scheme
MIMO Multiple Input Multiple Output
MU Multi-User
NDP Null Data Packet
NDPA NDP Announcement
OBSS Overlapping Basic Service Set
PER Packet Error Ratio/Packet Error Rate
PHY Physical Layer
PPDU PHY Protocol Data Unit
RRM Radio Resource Management
RX Receive or Receiver
SIFS Short Inter-frame Space
SINR Signal to Interference plus Noise Ratio
SR Spatial Reuse
STA Station
TX Transmit or Transmitter
TxOP Tx Opportunity
VHD Very High Density
WLAN Wireless local area network based on IEEE 802.11 and related standards Multiple WIFI access points (APs) of a basic service set (BSS) may use the same communication channel and space (fewer channels than APs) sharing the medium by using a CSMA/CA access method such that only one device transmits at a time, while the others are idle. Using a CSMA/CA access method, however, increases the collision and hidden nodes probability, which, in turn, result in an increased PER and noise level. In high-density (HD) and very high density (VHD) WIFI deployments, the distance between cells may be short (10 to 30 meters), which increases the unused time of Wi-Fi devices (or "Time Shared"). As long as the WIFI devices "hear" a signal larger than the clear channel assessment (CCA) threshold, they will refrain from using the medium. Therefore, in many HD/VHD deployments the throughput per channel is almost fixed and declines when the number of APs per channel increases. Therefore, adding more APs to the deployment usually does not increase the network data rate, as illustrated in FIG. 1.

The standard 802.11 TGax (also referred to as High-Efficiency Wireless (HEW)) focuses on implementing mechanisms to serve more users with a consistent and reliable stream of data (average throughput) in the presence of many other users. To improve the system level performance and the efficiency due to the CSMA/CA access method in WLAN scenarios, the 802.11ax standard implements a SR technique. SR enables the sharing of the medium between two or more Tx devices using the same channel, time and space. In order for an Rx device to select its transmitter in a SR environment, wireless stations can identify signals by using the BSS coloring scheme. When a wireless station that is actively listening to the medium detects an 802.11ax frame, it checks the BSS color bits. If the BSS color in the detected PPDU is the same color as its associated AP has announced, then the STA considers that frame as an intra-BSS frame. However, if the detected frame has a BSS color different from its own color, then the STA considers that frame as an inter-BSS frame from an overlapping BSS. Moreover, 802.11ax devices treat the medium as CCA-BUSY only during the time it takes the STA to validate that the frame is from an inter-BSS, but not longer than the time indicated as the length of the frame's payload.

SR is used in 802.11ax to utilize the medium (frequency, time and space) by multiple devices and to avoid collisions between those devices. In an example, SR allows multiple devices to share the same frequency, time and space by using a different BSS color and ID.

Figure 2:
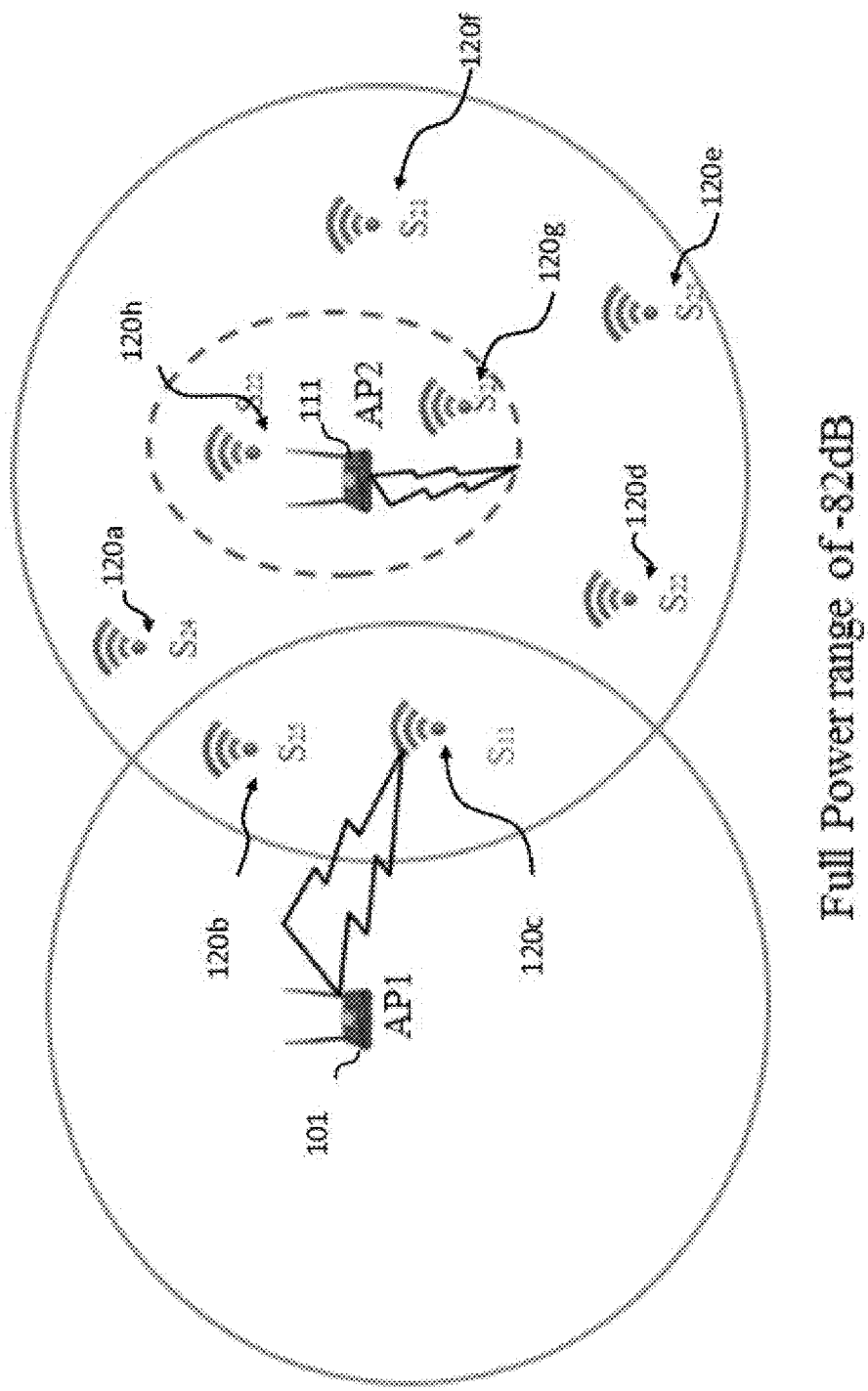
FIG. 2 shows an exemplary WLAN communication system.
Figure 5:
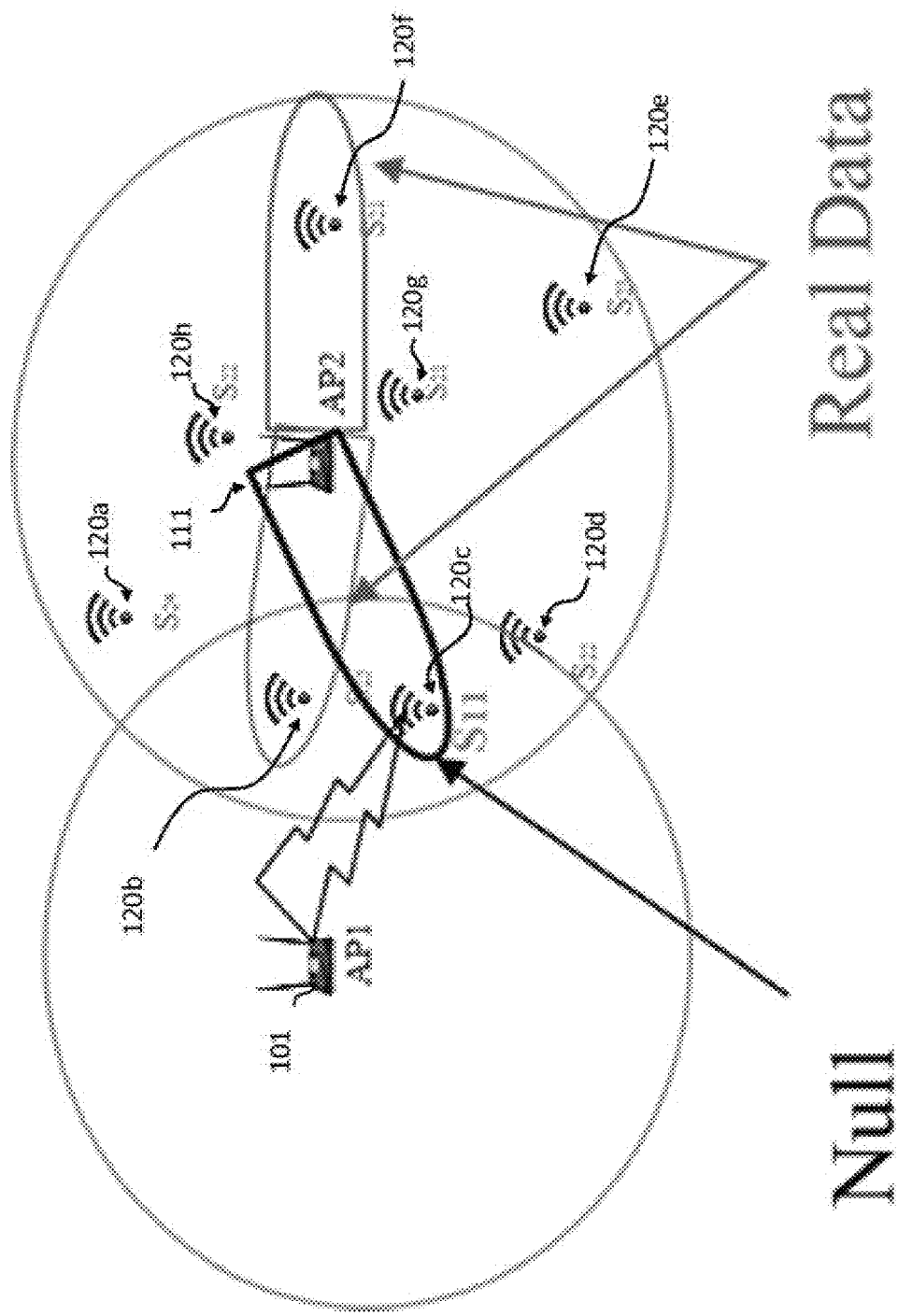
FIG. 5 shows a schematic diagram of a wireless communication system, including a wireless initiator access point according to an embodiment and a wireless participator access point according to an embodiment.

A SR session is initiated by the wireless AP that got access to the medium, i.e. has obtained a transmission opportunity (TxOP). This AP is referred to herein as the SR IAP that indicates that it is willing to share the medium with other devices. In FIG. 2 and FIG. 5, the IAP is identified by the reference sign 101 (or AP1). Other APs that have data to transmit, may start using the medium. Those APs are referred to herein as Participator APs (PAPs). In FIG. 2 and FIG. 5, a PAP is identified by the reference sign 111 (or AP2). The major SR challenge is the adjustment of the CCA threshold and Tx power level to prevent mutual interferences between the IAP 101 and the PAP 111. The main idea behind these adjustments is that the CCA threshold should be at a maximum level and the transmit power should be at a minimum level, i.e. working only with the STAs 120a-h (illustrated in FIG. 2 and FIG. 5) at close distance.

Based on this approach, the PAP 111 conventionally decreases its TX power in order to reduce interference with the IAP 101. However, a conventional reduction of the TX power of the PAP 111 significantly decreases the radius of its cell coverage, with the result that only the small number of wireless stations associated with the PAP 111 will benefit from the spatial reuse approach, while the other wireless stations will be out of coverage (as illustrated by the wireless stations 120a-h shown in FIG. 2). Using a low Tx power by the PAP 111 may also require using a lower MCS (both for the IAP 101 and the PAP 111), because of a lower SINR, more retransmissions, an inferior performance and a decreased efficiency.

BF and MU-MIMO have been introduced in the standard 802.11ac/ax. As already described above, a WLAN device (AP or STA) may steer its antenna beam to the receiver's direction by applying a MIMO digital beam-forming technique. In an example, a beam-former may steer more energy towards a desired direction, while suppressing the energy in other directions. Applying N Spatial Streams (SS) per user MU-MIMO enables sending different information to multiple receivers at the same time. Using beam-forming allows nulling or creating NULL per streams per direction (STA). In an example, BF allows spatial selectivity and better power exploitation.

As will be described in more detail in the following under reference to FIG. 3, FIG. 4, and FIG. 5, embodiments of the present disclosure provide a wireless initiator access point (IAP) 101 and a wireless participator access point (PAP) 111 that make use of beam-forming and MU MIMO for improving the SR efficiency by reducing the interference at the IAP 101 due to the PAP 111 as well as improving the SINR of the wireless stations 120a-h. According to an embodiment, both the IAP 101 and the PAP 111 are configured to obtain BF precoder information from all OBSS STAs 120a-h (that support a BF report), and use that information to send NULL data to the neighboring STA(s) 120a-h while in SR transaction time. In an embodiment, the wireless IAP 101 and the wireless PAP 111 are configured to operate in accordance with the IEEE 802.11 WLAN standard or a standard evolved therefrom, in particular 802.11ax or 802.11ac.

In an example, according to an embodiment the wireless initiator AP 101 comprises a communication interface with an array of antennas. The communication interface of the wireless initiator AP 101 is configured to operate the array of antennas with an adjustable precoding configuration for MU-MIMO communication with the plurality of multi-antenna wireless stations 120a-h, i.e. wireless clients or terminals. The communication interface of the wireless IAP 101 is configured to send an NDP Announcement frame 301 (as illustrated in FIGS. 3 and 4) to the plurality of wireless stations 120a-h and to trigger the wireless PAP 111 to send an NDP frame 303 to the plurality of wireless stations 120a-h. The communication interface of the wireless IAP 101 is further configured to receive a plurality of Compressed Beamforming frames (i.e. precoder information) 305a-c from the plurality of wireless stations 120a-h and to forward the plurality of Compressed Beamforming frames (i.e. the precoder information) 305a-c to the wireless PAP 111.

In an embodiment, the communication interface of the wireless IAP 101 is configured to send the NDP Announcement frame 301 to the plurality of wireless stations 120a-h and the wireless PAP 111 for triggering the wireless PAP 111 to send the NDP frame 303 to the plurality of wireless stations 120a-h. In other words, in an embodiment, the NDP Announcement frame 301 itself may be used as a triggering signal/message for the wireless PAP 111. In a further embodiment, the communication interface of the wireless IAP 101 may be configured to send a triggering signal or message via the IP backbone network to the wireless PAP 111 for triggering the wireless PAP 111 to send the NDP frame 303 to the plurality of wireless stations 120a-h.

Likewise, the wireless PAP 111 comprises a communication interface with an array of antennas, wherein the communication interface is configured to operate the array of antennas with an adjustable precoding configuration for MU-MIMO communication with the plurality of multi-antenna wireless stations, i.e. clients 120a-h. The communication interface of the wireless PAP 111 is further configured to be triggered to send an NDP frame 303 to one or more of the plurality of wireless stations 120a-h and/or to one or more of a further plurality of wireless stations 120a-h for triggering the one or more of the plurality of wireless stations 120a-h and/or the one or more of the further plurality of wireless stations 120a-h to send a plurality of Compressed Beamforming frames (including the precoder information) 305a-c to the wireless IAP 101. Moreover, the communication interface of the wireless PAP 111 is configured to receive the plurality of Compressed Beamforming frames 305a-c from the wireless IAP 101. The wireless PAP 111 further comprises a processing circuitry configured to determine the precoding configuration for operating its antenna array based on the precoder information included in the plurality of Compressed Beamforming frames 305a-c received from the wireless IAP 101.

In an embodiment, the wireless PAP 111 is configured to be triggered by the NDP Announcement frame 301 from the wireless PAP 111. In an example, in an embodiment, the communication interface of the wireless PAP 111 is configured to receive the NDP Announcement frame 301 from the wireless PAP 111 and to send, in response to the NDP Announcement frame 301, the NDP frame 303 to the one or more of the plurality of wireless stations 120a-h and/or to the one or more of the further plurality of wireless stations 120a-h. As described above, the NDP frame 303 from the wireless PAP 111 triggers the one or more of the plurality of wireless stations 120a-h and/or the one or more of the further plurality of wireless stations 120a-h to send a plurality of Compressed Beamforming frames (including the precoder information) 305a-c to the wireless IAP 101.

In an example, advantageously, using the existing 802.11 BF and MU-MIMO schemes of BF the wireless IAP 101 and the wireless PAP 111 may obtain precoder information from all relevant wireless stations 120a-h. Thereby, the wireless PAP 111 may increase its spatial reuse coverage, while reducing the interference between transmissions and maintaining a high SINR level with its wireless stations 120a-h by using the precoder information from the stations of the IAP 101. By increasing the SR coverage and SINR the SR efficiency is improved.

In an embodiment, the wireless PAP 111 may create NULL(s) to a plurality of neighboring wireless STA(s) 120a-h while sending data to one or more of the target STA(s) 120a-h. This ensures a minimal interference with all the target STA(s) 120a-h of the IAP 101, while enabling a higher SINR and data rate. By increasing its TX power, the wireless PAP 111 may send data to STAs 120a-h located at larger distances and, thereby, increase the number of candidate stations 120a-h available for SR availability (with a larger TX power and data rate). The station candidates for transmission may be any of the AP STAs 120a-h, which, however, may require a frequency and time synchronization.

In an example, for being able to send a NULL to a specific non-associated STA 120a-h, the wireless IAP 101 and the wireless PAP 111 collaborate for obtaining the precoder information from all STAs 120a-h. As illustrated in FIG. 3 in the context of a sounding scheme in compliance with the 802.11ac standard, the IAP 101 prepares its STAs 120a-h for precoder measurements by sending the NDP announcement frame 301 to these stations 120a-h. In an embodiment, the wireless IAP 101 is configured to send the NDP announcement frame 301 only to those wireless STAs 120a-h that can be part of the SR process with the wireless PAP 111. In order to find out which of the STAs 120a-h hear the wireless PAP 111, the wireless IAP 101 may be configured to request an AP Beacon measurement from all associated STAs 120a-h.

Figure 3:
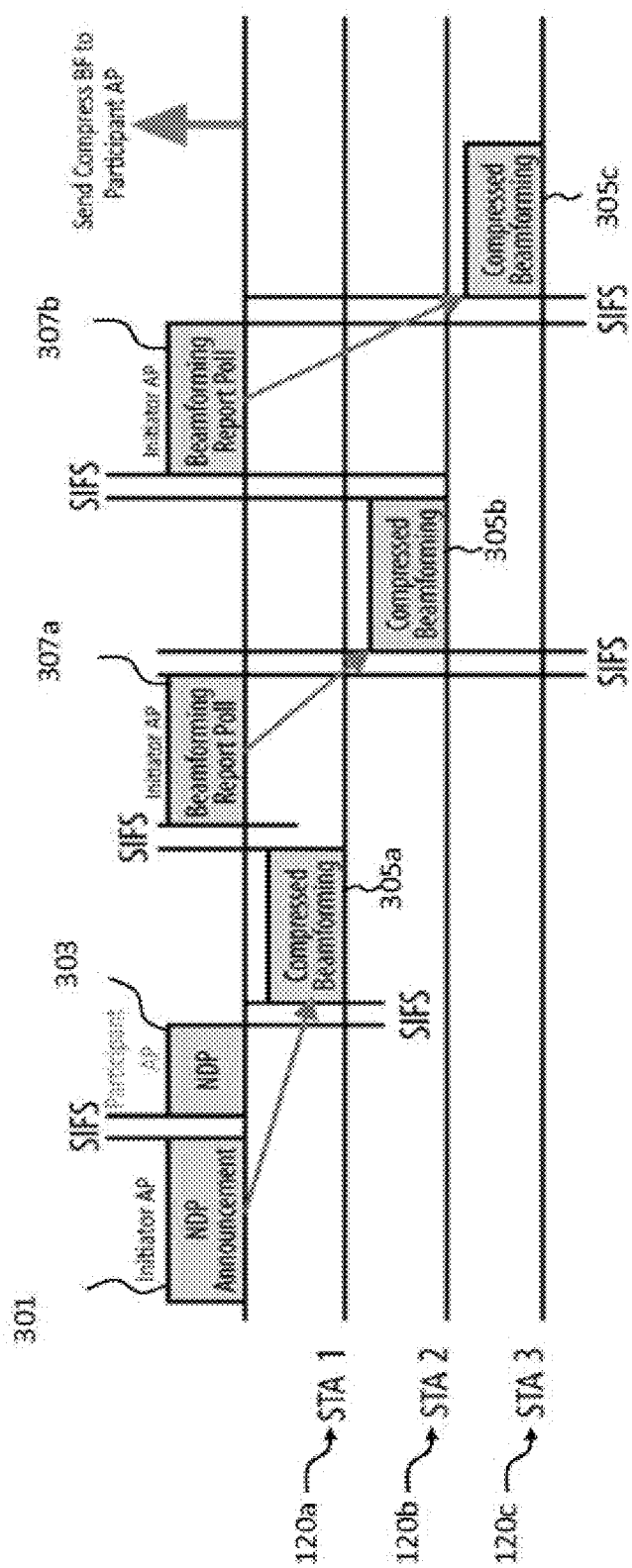
FIG. 3 shows a diagram illustrating a sounding scheme in a wireless communication system, including a wireless initiator access point according to an embodiment and a wireless participator access point according to an embodiment.

As illustrated in FIG. 3, a SIFS time interval after the NDP announcement frame 301 was sent, the wireless PAP 111 sends the pilots (NDP frame) 303 instead of the initiator AP 101 (the STAs 120a-h will receive and calculate the compressed BF). Each STA 120a-h will respond (send) to the wireless IAP 101 a beam-forming report 305a-c (including the precoder information), possibly in response to a Beamforming report Poll 307a,b from the wireless IAP 101. Upon collecting the compressed BF reports 305a-c from all stations 120a-h, the wireless IAP 101 sends the precoder information to the wireless PAP 111. In an embodiment, the wireless IAP 101 may be configured to forward the plurality of Compressed Beamforming frames 305a-c via an IP backbone network to the wireless PAP 111.

Figure 4:
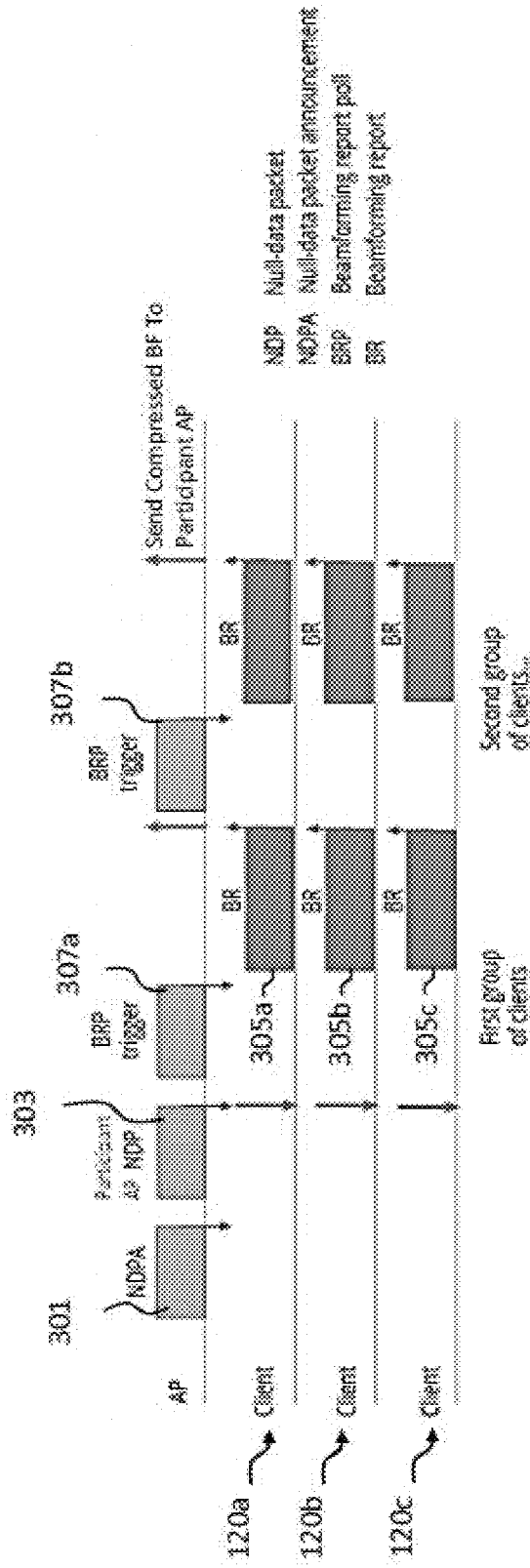
FIG. 4 shows a further diagram illustrating a sounding scheme in a wireless communication system, including a wireless initiator access point according to an embodiment and a wireless participator access point according to an embodiment.

FIG. 4 illustrates a further sounding scheme implemented by the wireless IAP 101 and the wireless PAP 111 in compliance with the 802.11ax standard, wherein the sounding scheme is performed as part of the multi user uplink (MU UL).

As will be appreciated, for enabling the wireless PAP 111 to send the pilots (NDP frame(s) 303), the wireless PAP 111 should be able to know that the NDP Announcement (NDPA) frame 301, also referred to as NDPA 301, emitted by the wireless IAP 101 started the sounding process for the wireless PAP 111. In an embodiment, this may be achieved by reserving several AIDs for neighboring APs, and when such a sounding process starts, the NDPA 301 will include the AID, i.e. an identifier of the wireless PAP 111. In an embodiment, the wireless PAP 111 may send the NDP frame 303 according to the NDPA transmitter address (TA) and the above AID.

In the exemplary sounding scenario illustrated in FIG. 5 AP1 is the wireless IAP 101, i.e. the SR initiator that transmits to the exemplary wireless station 120c (i.e. S11) while utilizing the traffic and using BF. AP2 as the wireless PAP 111 transmits, by way of example, to the wireless stations 120b and 120f, i.e. S21 and S23. The wireless PAP 111 may decide whether to join the SR session and select the STAs 120a-h to transmit to. The wireless PAP 111 maximizes its SR efficiency by creating a NULL to the wireless station 120c (i.e. STA11) and using a higher Tx power as well as beam-forming for transmitting to the wireless stations 120b and 120f, i.e. S21 and S23. As will be appreciated, the total number of spatial stream(s) (SS(s)) and NULL(s) that can be used by the wireless PAP 111 may have to be less than the number of antennas of the wireless PAP 111.

Figure 6:
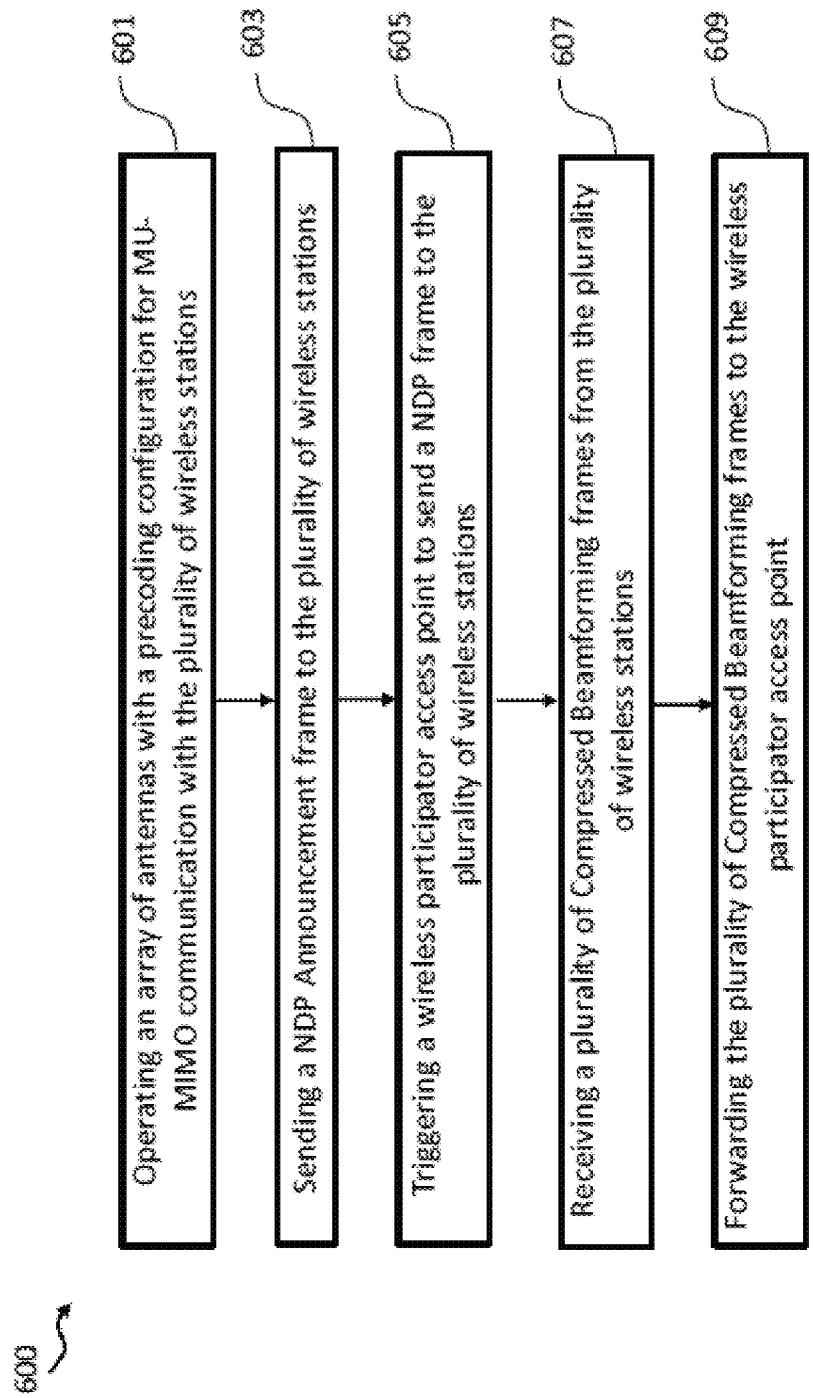
FIG. 6 is a flow diagram illustrating a wireless transmission method according to an embodiment.

FIG. 6 shows a flow diagram illustrating a corresponding method 600 for MU-MIMO communication with the plurality of multi-antenna wireless stations, i.e. clients 120a-h. The method 600 comprises the steps of operating 601 the array of antennas of the wireless IAP 101 with an adjustable precoding configuration for MU-MIMO communication with the plurality of wireless stations 120a-h; sending 603 an NDPA frame 301 to the plurality of wireless stations, i.e. clients 120a-h; triggering 605 the multi-antenna wireless PAP 111 to send an NDP frame 303 to the plurality of wireless stations 120a-h; receiving 607 a plurality of Compressed Beamforming frames 305a-c (including precoder information) from the plurality of wireless stations 120a-h; and forwarding 609 the plurality of Compressed Beamforming frames 305a-c (including the precoder information) to the wireless PAP 111.

In an embodiment, the step of sending 603 the NDP Announcement frame 301 comprises sending the NDP Announcement frame 301 to the plurality of wireless stations 120a-h and the wireless PAP 111 for triggering 605 the wireless PAP 111 to send the NDP frame 303 to the plurality of wireless stations 120a-h.

Further features of the method 600 result directly from the structure and/or functionality of the wireless IAP 101 and the wireless PAP 111 as well as their different embodiments described above.

The person skilled in the art will understand that the "blocks" ("units") of the various figures (method and apparatus) represent or describe functionalities of embodiments of the present disclosure (rather than necessarily individual "units" in hardware or software) and may describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

What is claimed is:

1. A wireless initiator access point, comprising:
    a communication interface with an array of antennas, wherein the communication interface is configured to:
        operate the array of antennas with a precoding configuration for multi-user multiple-input multiple-output (MU-MIMO) communication with a plurality of wireless stations;
        send a null data packet (NDP) announcement frame to the wireless stations and to a wireless participator access point (PAP) for triggering the wireless PAP to send an NDP frame to the wireless stations;
        receive a plurality of compressed beamforming frames from the wireless stations; and
        forward the compressed beamforming frames to the wireless PAP.

2. The wireless initiator access point of claim 1, wherein the communication interface is further configured to:
    request AP beacon information from the wireless stations; and
    further send, based on the AP beacon information, the NDP announcement frame to the wireless stations.

3. The wireless initiator access point of claim 1, wherein the communication interface is further configured to forward the plurality of compressed beamforming frames via an Internet Protocol (IP) backbone network to the wireless PAP.

4. The wireless initiator access point of claim 1, wherein the NDP Announcement frame comprises information on whether the wireless initiator access point sends the NDP frame to the wireless stations or whether the wireless PAP sends the NDP frame to the wireless stations.

5. The wireless initiator access point of claim 1, wherein the communication interface is further configured to operate in accordance with an 802.11 wireless local area network (WLAN) standard or an evolution of the 802.11 WLAN standard.

6. The wireless initiator access point of claim 1, wherein the communication interface is further configured to determine a precoding configuration based on the compressed beamforming frames.

7. The wireless initiator access point of claim 1, wherein the precoding configuration comprises a steering matrix, and wherein the communication interface is further configured to null one or more of the wireless stations based on the steering matrix.

8. A wireless participator access point (PAP), comprising:
a communication interface with an array of antennas, wherein the communication interface is configured to:
operate the array of antennas with a precoding configuration for multi-user multiple-input multiple-output (MU-MIMO) communication with a plurality of wireless stations;
receive a trigger for sending a null data packet (NDP) frame to one or more of the wireless stations for triggering one or more of the wireless stations to send a plurality of compressed beamforming frames to a wireless initiator access point; and
receive the compressed beamforming frames from the wireless initiator access point; and
processing circuitry coupled to the communication interface and configured to determine a precoding configuration based on the compressed beamforming frames.

9. The wireless PAP of claim 8, wherein the communication interface is configured to:
receive an NDP Announcement (NDPA) frame from the wireless initiator access point; and
further send, in response to the NDPA frame, the NDP frame to the wireless stations for triggering one or more of the wireless stations to send the compressed beamforming frames to the wireless initiator access point.

10. The wireless PAP of claim 8, wherein the NDP Announcement frame comprises information on whether the wireless PAP sends the NDP frame to the wireless stations.

11. The wireless PAP of claim 8, wherein the precoding configuration comprises a steering matrix, and wherein the communication interface is configured to null one or more of the wireless stations based on the steering matrix.

12. The wireless PAP of claim 8, wherein the wireless participator access point is an Overlapping Basic Service Set (OBSS) of the wireless initiator access point.

13. The wireless PAP of claim 8, wherein the communication interface is further configured to operate in accordance with an 802.11 wireless local area network (WLAN) standard or an evolution of the 802.11 WLAN standard.

14. A method for multi-user multiple-input multiple-output (MU-MIMO) communication implemented by a wireless initiator access point, wherein the method comprises:
operating an array of antennas of a wireless initiator access point with a precoding configuration for multi-user multiple-input multiple-output (MU-MIMO) communication with a plurality of wireless stations;
sending a null data packet (NDP) Announcement frame to the wireless stations and to a wireless participator access point (PAP) to trigger the wireless PAP to send an NDP frame to the wireless stations;
receiving a plurality of compressed beamforming frames from the wireless stations; and
forwarding the compressed beamforming frames to the wireless PAP.

15. The method of claim 14, wherein the sending comprises sending the NDP Announcement frame to the wireless stations and to the wireless PAP for triggering the wireless PAP to send the NDP frame to the wireless stations.

16. The method of claim 14, further comprising determining the precoding configuration based on the plurality of compressed beamforming frames.

17. The method of claim 14, wherein the precoding configuration comprises a steering matrix, and wherein the method further comprises nulling one or more of the wireless stations based on the steering matrix.

18. The method of claim 14, further comprising:
requesting AP beacon information from the wireless stations; and
sending, based on the AP beacon information, the NDP Announcement frame to one or more of the wireless stations that are able to communicate with the wireless PAP.

19. The method of claim 14, further comprising forwarding the plurality of compressed beamforming frames via an Internet Protocol (IP) backbone network to the wireless PAP.

20. The method of claim 14, further comprising further operating the wireless initiator access point in accordance with an 802.11 wireless local area network (WLAN) standard or an evolution of the 802.11 WLAN standard.

* * * * *